E. H. SCHMIDT.
SHOCK ABSORBING MECHANISM.
APPLICATION FILED JULY 8, 1919.

1,368,578. Patented Feb. 15, 1921.

Inventor
Ernest H. Schmidt

By his Attorney
Clarence D. Kerr

UNITED STATES PATENT OFFICE.

ERNEST H. SCHMIDT, OF CLEVELAND HEIGHTS, OHIO, ASSIGNOR TO THE NATIONAL MALLEABLE CASTINGS COMPANY, OF CLEVELAND, OHIO, A CORPORATION OF OHIO.

SHOCK-ABSORBING MECHANISM.

1,368,578.      Specification of Letters Patent.      Patented Feb. 15, 1921.

Application filed July 8, 1919. Serial No. 309,376.

*To all whom it may concern:*

Be it known that I, ERNEST H. SCHMIDT, a citizen of the United States, residing at Cleveland Heights, Cuyahoga county, Ohio, have invented new and useful Improvements in Shock-Absorbing Mechanism, of which the following is a specification, reference being had to the accompanying drawings, in which—

Figure 1:
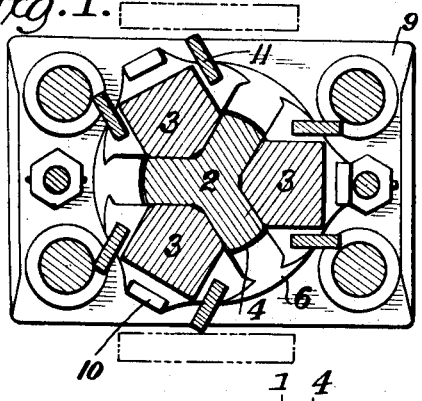
Figure 2:
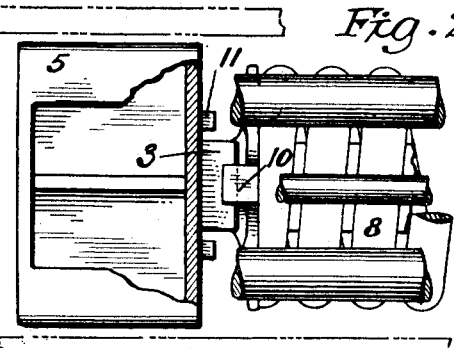
Figure 3:
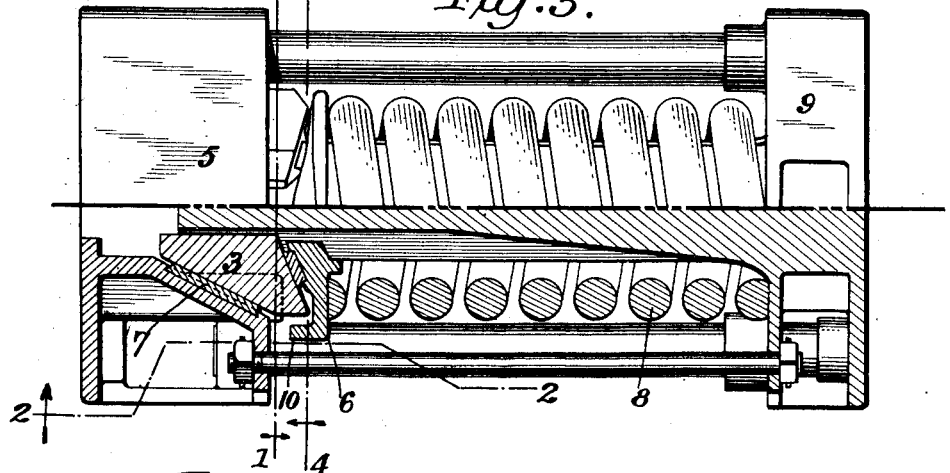
Figure 4:
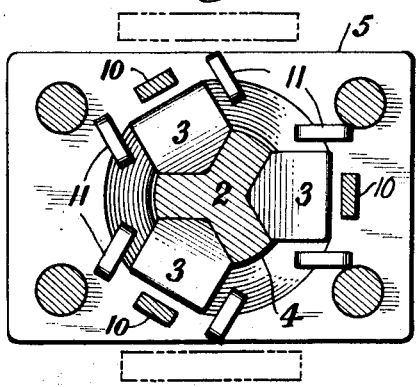
Figure 5:
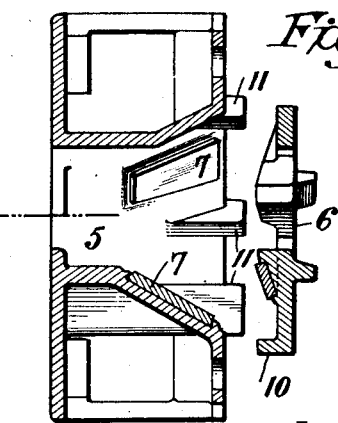

Figure 1 is a section on lines 1—1 of Fig. 3, showing my improvements applied to a shock absorbing mechanism; Fig. 2 is a longitudinal section thereof on lines 2—2 of Fig. 3; Fig. 3 is a top plan view partly in section; Fig. 4 is a section on lines 4—4 of Fig. 3; and Fig. 5 shows sectional details of the wedge and follower.

My invention relates to shock absorbing mechanism of the friction type and consists in means for holding the friction members in position in case of breakage of a spring or of the other parts of the mechanism. My invention also consists in the construction and arrangement of the parts, which I shall hereinafter describe and claim.

Referring to the drawings, in which I have shown my invention applied to shock absorbing mechanism of the included friction type, 2 indicates the central friction element having friction shoes or members 3 arranged between the arms 4 thereof and held against the friction faces of such arms by means of a wedge 5 and a follower 6, which encircle the friction element 2 and have pads 7 secured thereto to prevent the wedges and shoes from sticking together. The spring 8 also encircles the friction element 2 and bears at one end against the base 9 of the friction element and at its other end against the inner face of the follower 6.

The shoes 3 are held in position between the arms 4 of the friction element by lugs 10 on the follower 6 which prevents them from tipping away from the element 2, and by the projections 11 on the wedge 5 which are arranged one on each side of each of the shoes and hold them against lateral displacement.

It will be seen that even if the spring 8 breaks and thus permits looseness in the gear that the lugs 10, as they overlap the ends of the shoes 3 will prevent them from tipping out of place and that the projections 11 as they are placed at the sides of the shoes will prevent lateral displacement thereof. My invention is, therefore, of particular advantage, since it prevents the shoes from assuming a position out of operative relation to the wedge 5 and friction element 2 and prevents their falling out or being lost even though one or more coils of the spring or any other part, such as the retaining bolts or follower 6, break.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a frictional shock absorbing mechanism, a central friction element, friction members arranged about said element and in frictional engagement therewith, pressure transmitting members and a spring, at least one of the pressure transmitting members carrying means for holding the friction members in operative position with reference to the friction element on breakage of the parts.

2. In a frictional shock absorbing mechanism, a central frictional element, friction members arranged about said element in frictional engagement therewith, pressure transmitting members and a spring, one of the pressure transmitting members having projections overlapping with the friction members to hold said friction members in operative position with reference to the friction element on breakage of the parts.

3. In frictional shock absorbing mechanism, a central frictional element, friction members arranged about said element and in frictional engagement therewith, a wedge and a follower engaging the friction members, and a spring, the wedge and follower having projections thereon overlapping the friction members and adapted to hold them in operative position with reference to the frictional element regardless of looseness or breakage of the parts.

ERNEST H. SCHMIDT.